(12) United States Patent
Kitagawa et al.

(10) Patent No.: US 7,327,417 B2
(45) Date of Patent: Feb. 5, 2008

(54) DISPLAY DEVICE

(75) Inventors: Masakazu Kitagawa, Fukaya (JP); Hiroshi Nagahama, Kanazawa (JP)

(73) Assignee: Toshiba Matsushita Display Technology, Tokyo (JP)

( * ) Notice: Subject to any disclaimer, the term of this patent is extended or adjusted under 35 U.S.C. 154(b) by 350 days.

(21) Appl. No.: 11/197,398

(22) Filed: Aug. 5, 2005

(65) Prior Publication Data

US 2006/0028597 A1 Feb. 9, 2006

(30) Foreign Application Priority Data

Aug. 9, 2004 (JP) ............................. 2004-232476
Dec. 9, 2004 (JP) ............................. 2004-356873

(51) Int. Cl.
*G02F 1/1335* (2006.01)
(52) U.S. Cl. ........................................... 349/65
(58) Field of Classification Search ................... 349/65
See application file for complete search history.

(56) References Cited

U.S. PATENT DOCUMENTS 5,810,464 A * 9/1998 Ishikawa et al. ............ 362/620

6,937,298 B2 * 8/2005 Okada ........................ 349/58
7,220,181 B2 * 5/2007 Okada ........................ 463/32
2004/0214644 A1 * 10/2004 Emori et al. .................. 463/46

FOREIGN PATENT DOCUMENTS

JP 2000-308551 11/2000
JP 2004-57419 2/2004
JP 2004-166963 6/2004

* cited by examiner

*Primary Examiner*—James A. Dudek
(74) *Attorney, Agent, or Firm*—Oblon, Spivak, McClelland, Maier & Neustadt, P.C.

(57) ABSTRACT

A display device includes a transmissive liquid crystal display panel that is disposed on a front side of a display medium that effects variable display, and an area light source device that is disposed between the liquid crystal display panel and the display medium and illuminates a back surface of the liquid crystal display panel. The area light source device includes a light source, and a light guide that includes a transmissive display part, which is opposed to the display medium, and emits light, which is radiated from the light source, toward the liquid crystal display panel. The light guide is configured such that a thickness at an end face along an edge that defines the transmissive display part is less than a thickness at a surface of the light guide, which is opposed to the light source.

15 Claims, 6 Drawing Sheets

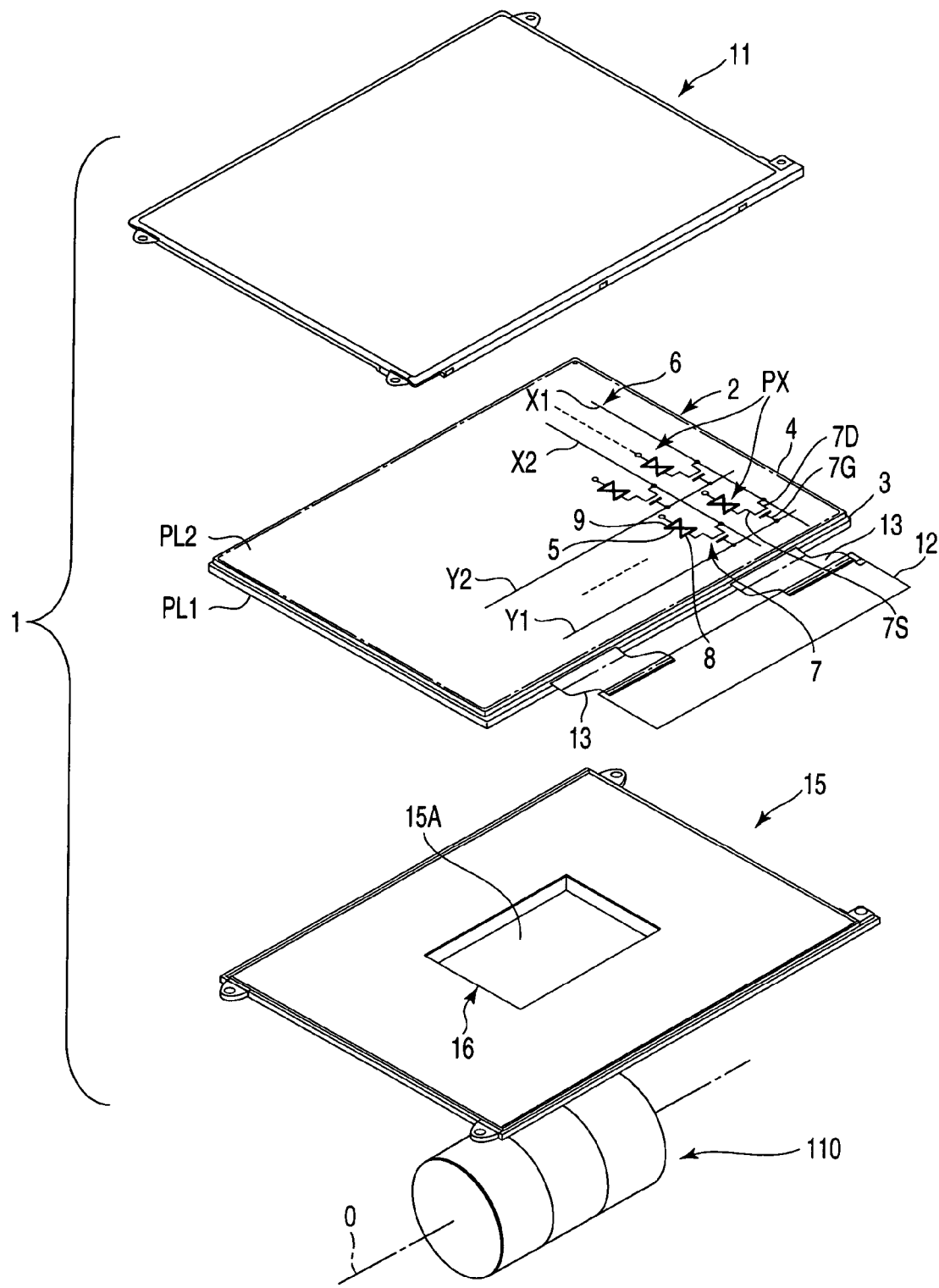
F I G. 1

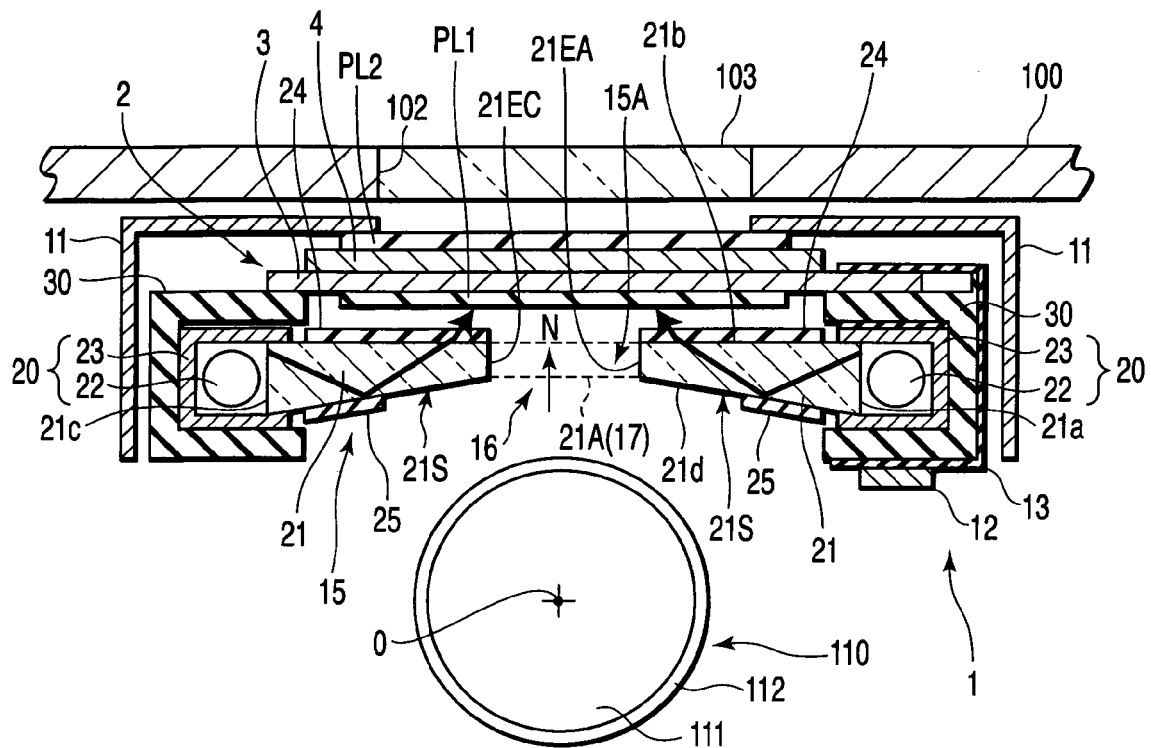
F I G. 3
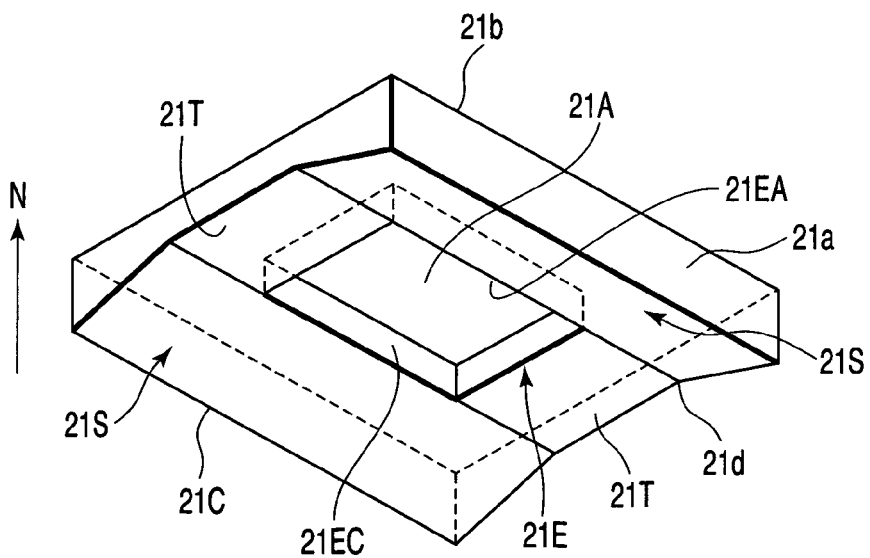
F I G. 4

DISPLAY DEVICE

CROSS-REFERENCE TO RELATED APPLICATIONS

This application is based upon and claims the benefit of priority from prior Japanese Patent Applications No. 2004-232476, filed Aug. 9, 2004; and No. 2004-356873, filed Dec. 9, 2004, the entire contents of both of which are incorporated herein by reference.

BACKGROUND OF THE INVENTION

1. Field of the Invention

The present invention relates generally to a display device, and more particularly to a liquid crystal display device including a transmissive liquid crystal display panel and an area light source device that illuminates the transmissive liquid crystal display panel.

2. Description of the Related Art

Liquid crystal display devices have been applied to various fields as display devices for OA equipment and information terminals such as computers, taking advantage of their features of light weight, small thickness and low power consumption. In recent years, the liquid crystal display devices have also been applied to game machines such as slot machines. A liquid crystal display panel, which is mounted on a game machine, is, for example, fitted on the entirety of a display window of the casing of the game machine.

Specifically, a central part of the liquid crystal display panel is provided with a window section that makes it possible to view from outside a lottery result that is based on pictures on a rotary reel, which is contained in the casing of the game machine. There has been proposed a game machine having such a structure that both display content on the liquid crystal display panel and pictures on the rotary reel are visible at the same time (see, e.g. Jpn. Pat. Appln. KOKAI Publication No. 2004-57419).

BRIEF SUMMARY OF THE INVENTION

The present invention has been made in consideration of the problem in the above-described related art, and the object of the invention is to provide a display device capable of achieving reduction in thickness and improving visibility of a display medium that is disposed behind a display panel.

According to an aspect of the present invention, there is provided a display device comprising: a transmissive liquid crystal display panel that is disposed on a front side of a display medium that effects variable display; and an area light source device that is disposed between the liquid crystal display panel and the display medium and illuminates a back surface of the liquid crystal display panel, wherein the area light source device includes: a light source; and a light guide that includes a transmissive display part, which is opposed to the display medium, and emits light, which is radiated from the light source, toward the liquid crystal display panel, and the light guide is configured such that a thickness at an end face along an edge that defines the transmissive display part is less than a thickness at a surface of the light guide, which is opposed to the light source.

The present invention can provide a display device capable of achieving reduction in thickness and improving visibility of a display medium that is disposed behind a display panel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exploded perspective view that schematically shows the structure of a liquid crystal display device according to an embodiment of the present invention;

FIG. 3 is a cross-sectional view that schematically shows the structure of a liquid crystal display device according to a first embodiment, which is applied to a game machine;

FIG. 4 is a perspective view that schematically shows the structure of a light guide that is applicable to the liquid crystal display device shown in FIG. 3;

DETAILED DESCRIPTION OF THE INVENTION

Figure 2:
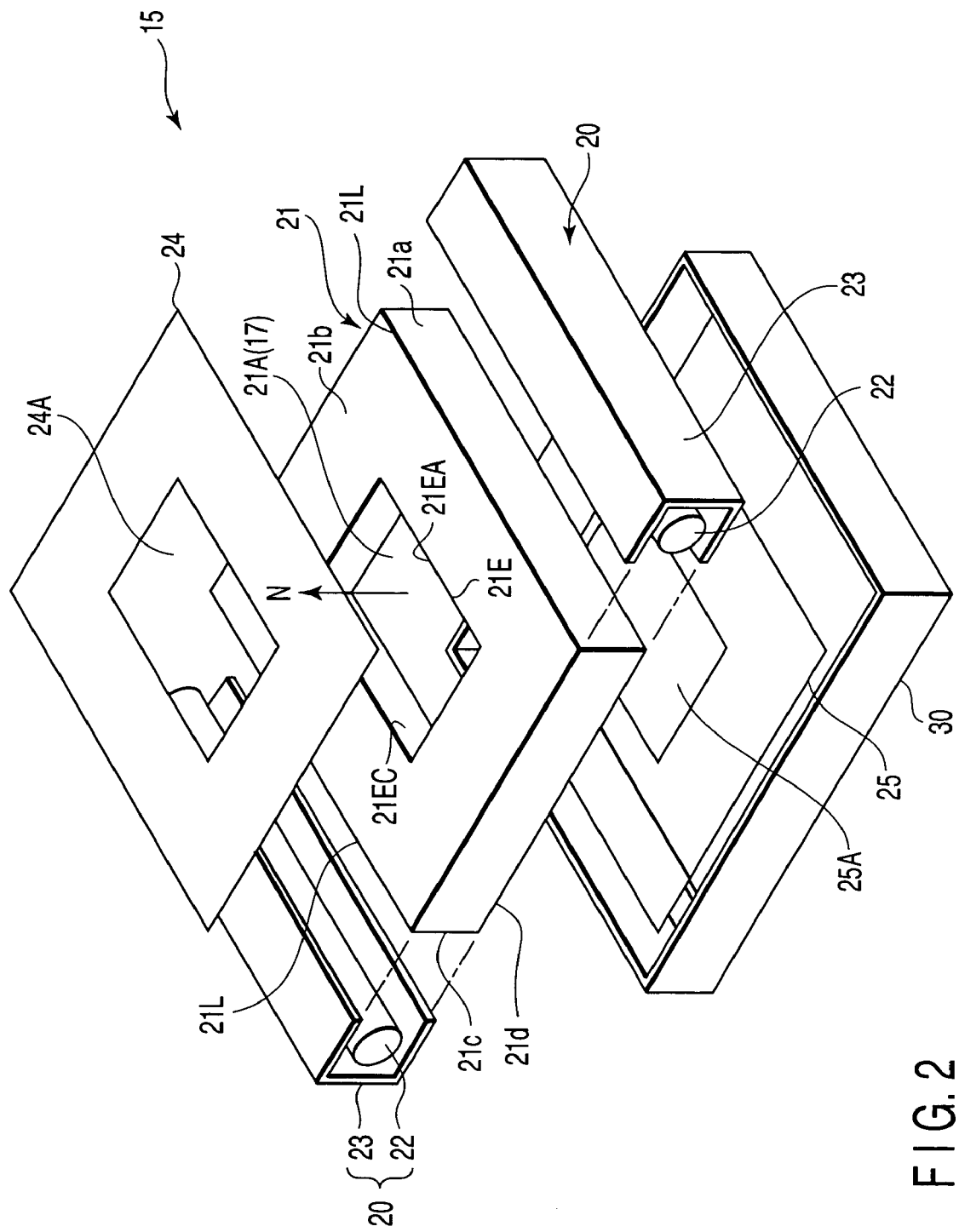
FIG. 2 is an exploded perspective view that schematically shows the structure of a backlight that is mounted on the liquid crystal display device shown in FIG. 1.

A display device according to an embodiment of the present invention, in particular, a liquid crystal display device that is applicable to a game machine, will now be described with reference to the accompanying drawings.

As is shown in FIG. 1, a liquid crystal display device 1 includes a substantially rectangular, planar transmissive liquid crystal display panel 2. The liquid crystal display panel 2 is configured such that a liquid crystal layer 5 that serves as an optical modulation layer is interposed between a pair of substrates, that is, an array substrate 3 and a counter-substrate 4. The liquid crystal display panel 2 includes a substantially rectangular effective display section 6 that displays an image. The effective display section 6 is composed of a plurality of display pixels PX that are arranged in a matrix.

The array substrate 3 includes a plurality of scan lines Y (1, 2, 3, ..., m) that extend in a row direction of the display pixels PX, a plurality of signal lines X (1, 2, 3, ..., n) that extend in a column direction of the display pixels PX, switching elements 7 that are arranged near intersections between scan lines Y and signal lines X, and pixel electrodes 8 that are connected to the switching elements 7.

The switching element 7 is formed of, e.g. a thin-film transistor (TFT). The switching element 7 has a gate electrode 7G that is electrically connected to the associated scan line Y (or formed integral with the scan line). The switching element 7 has a drain electrode 7D that is electrically connected to the associated signal line X (or formed integral with the signal line). The switching element 7 has a source electrode 7S that is electrically connected to the pixel electrode 8 of the associated display pixel PX.

The counter-substrate 4 includes a counter-electrode 9 that is common to all the display pixels PX in the effective display section 6. The pixel electrodes 8 and counter-electrode 9 are formed of an electrically conductive material with light transmissivity such as ITO (indium tin oxide). The array substrate 3 and counter-substrate 4 are disposed such that the pixel electrodes 8 are opposed to the counter-electrode 9, and a gap is provided therebetween. The liquid crystal layer 5 is formed of a liquid crystal composition that is sealed in the gap between the array substrate 3 and counter-substrate 4.

In the liquid crystal display panel 2, a pair of polarizer plates PL1 and PL2, whose directions of polarization are set in accordance with the characteristics of the liquid crystal layer 5, are provided on the outer surface of the array substrate 3 and the outer surface of the counter-substrate 4.

In a color display type liquid crystal display device, the liquid crystal display panel 2 includes a plurality of kinds of display pixels, for instance, a red pixel that displays red (R), a green pixel that displays green (G), and a blue pixel that displays blue (B). Specifically, the red pixel includes a red color filter that passes light with a principal wavelength of red. The green pixel includes a green color filter that passes light with a principal wavelength of green. The blue pixel includes a blue color filter that passes light with a principal wavelength of blue. These color filters are disposed on a major surface of the array substrate 3 or counter-substrate 4.

The liquid crystal display panel 2 with the above-described structure is disposed between a bezel cover 11 having a rectangular frame-like shape and a backlight 15 that functions as an area light source device. Specifically, the backlight 15, together with the liquid crystal display panel 2, is formed integral with the bezel cover 11 in the state in which the upper surface of the backlight 15 is opposed to the back surface (array substrate-side surface) of the liquid crystal display panel 2. The backlight 15 illuminates the back side of the liquid crystal display panel 2.

A driver circuit 12, which supplies a drive signal to the liquid crystal display panel 2, is electrically connected to one side edge of the liquid crystal display panel 2 via a flexible printed circuit board 13. The driver circuit 12 is disposed on the back side of the backlight 15 by bending the printed circuit board 13 toward the back side of the backlight 15.

As is shown in FIG. 2 and FIG. 3, the backlight 15 includes a light source unit 20 and a light guide 21. The light source unit 20 includes a cold-cathode fluorescent lamp 22 and a lamp reflector 23. Specifically, the cold-cathode fluorescent lamp 22 is an elongated cylindrical tubular light source that is disposed along a side, for instance, a long side, of the substantially rectangular light guide 21. The lamp reflector 23 reflects emission light, which comes from the cold-cathode fluorescent lamp 22, toward the light guide 21. The lamp reflector 23 is disposed so as to surround the cold-cathode fluorescent lamp 22.

The light guide 21 is formed of a light transmissive resin material such as an acrylic resin or a polycarbonate resin. The light guide 21 is formed in a substantially rectangular shape. The light guide 21 has a first major surface (upper surface) 21b that faces the liquid crystal display panel 2, a second major surface (back surface) 21d that is opposed to the first major surface 21b, and a first side surface 21a and a second side surface 21c that connect the first major surface 21b and second major surface 21d. The first side surface 21a and second side surface 21c are opposed to each other, and each of the first side surface 21a and second side surface 21c has a rectangular shape.

In this embodiment, the light source unit 20 is disposed along each of a pair of long sides 21L of the light guide 21. Specifically, the cold-cathode fluorescent lamps 22 are disposed to face, and to be substantially parallel to, the first side surface 21a and second side surface 21c along the long sides 21L of the light guide 21. To be more specific, the first side surface 21a and second side surface 21c of the light guide 21 correspond to light incidence surfaces, on which emission light from the cold-cathode fluorescent lamp 22 is incident.

The light guide 21 with the above structure is capable of propagating linear emission light, which has been made incident from the cold-cathode fluorescent lamps 22 through the first side surface 21a and second side surface 21c, and is capable of emitting the propagated light from the first major surface 21b and second major surface 21d. The first major surface 21b and second major surface 21d of the light guide 21 correspond to light emission surfaces for emitting the light that has entered the light guide 21.

A substantially rectangular optical sheet 24 is disposed so as to cover the first major surface 21b of the light guide 21. The optical sheet 24 imparts predetermined optical characteristics to the emission light from the first major surface 21b of the light guide 21. The optical sheet 24 is, for instance, a light converging sheet that converges emission light from the first major surface 21b, a diffusion sheet that diffuses emission light from the first major surface 21b, etc.

A substantially rectangular optical sheet 25 is a reflection sheet that reflects emission light, which emerges from the second major surface 21d of the light guide 21, back to the light guide 21. A reflection plate may be used for the optical sheet (reflection sheet) 25.

The light source units 20, light guide 21 and optical sheets 24 and 25 are accommodated in a substantially rectangular frame 30.

The liquid crystal display device with the above-described structure operates as follows. Electric energy is supplied to the cold-cathode fluorescent lamps 22 of the paired light source units 20, thereby turning on the cold-cathode fluorescent lamps 22. Linear emission lights from the cold-cathode fluorescent lamps 22 are reflected by the inner surfaces of the lamp reflectors 23 that cover the cold-cathode fluorescent lamps 22, and are made to travel toward the first side surface 21a and second side surface 21c of the light guide 21. The incident light that has entered the light guide 21 through its first side surface 21a and second side surface 21c propagates within the light guide 21 and is refracted or reflected toward the first major surface 21b and second major surface 21d of the waveguide 21. The emission light emerging from the second major surface 21d of the light guide 21 is reflected back into the light guide 21 by the optical sheet 25.

While the emission light from the first major surface 21*b* of the light guide 21 is passing through the optical sheet 24, the light is given predetermined optical characteristics. For example, the light is properly converged or diffused. Thereby, the luminance of the emission light from the first major surface 21*b* of the light guide 21 is enhanced and made uniform.

Illumination light from the backlight 15, that is, light emerging from the optical sheet 24, is led to the back surface of the liquid crystal display panel 2. The illumination light that is led to the liquid crystal display panel 2 selectively passes through the effective display section 6 of the liquid crystal display panel 2. Thereby, an image is displayed on the effective display section 6 of the liquid crystal display panel 2.

Next, a description is given to a liquid crystal display device 1 that is used for a game machine such as slot machine. As is shown in FIG. 1 and FIG. 3, the game machine includes a mechanical rotary reel 110 that is rotatably disposed within a casing 100 as a display medium for effecting variable display. The rotary reel 110 comprises a plurality (e.g. three) cylindrical reel bodies 111 that are rotatable about a rotational axis O, and strip-like reel tapes 112 that are attached to the cylindrical surfaces of the reel bodies 111. The reel tape 112 has a plurality of pictures that are arranged at equal intervals. The reel bodies 111 are arranged in a direction of the rotational axis O. A longitudinal direction of the display medium is parallel to the rotational axis O.

The liquid crystal display device 1 is disposed on the front side (i.e. viewer's side) of the rotary reel 110 within the casing 100. Specifically, the liquid crystal display panel 2 is disposed on the front side of the rotary reel 110, and the backlight 15 is disposed between the liquid crystal display panel 2 and the rotary reel 110. The casing 100 has a window section 102 that permits viewing of an image that is displayed on the liquid crystal display device 1. The window section 102 is equipped with a light-transmissive protection plate 103 such as a glass plate.

The backlight 15, which is mounted on the liquid crystal display device 1, includes a transmissive section 16 in its substantially central part in such a manner that the position of the transmissive section 16 corresponds to the position of the rotary reel 110. The light guide 21 includes a transmissive display part 17 that corresponds to the transmissive section 16. On the other hand, the rotary reel 110 is disposed at a position corresponding to a substantially central part of the liquid crystal display panel 2. Specifically, in the above-described liquid crystal display panel 2, it is possible in a first display mode to display an image on the entirety of the effective display section 6. In addition, it is possible in a second display mode to create a light transmissive state in a central area of the effective display section 6, which corresponds to the transmissive section 16 of the backlight 15, and to display an image on the other area of the effective display section 6. In the second display mode, a picture on the rotary reel 100, which is disposed on the back side of the liquid crystal display panel 2 and the transmissive section 16 of the backlight 15, is made visible through the liquid crystal display panel 2 and the transmissive section 16 of the backlight 15.

As is shown in FIGS. 1 to 3, in the liquid crystal display device according to the first embodiment, the backlight 15 has an opening part 15A corresponding to the transmissive section 16. Specifically, the light guide 21 has an opening part 21A corresponding to the transmissive display part 17. The opening part 21A is opposed to the rotary reel 110.

Similarly, the optical sheet 24 has an opening part 24A corresponding to the transmissive section 16, and the optical sheet 25 has an opening part 25A corresponding to the transmissive section 16. In this embodiment, the transmissive section 16 of the backlight 15 is substantially rectangular, and accordingly the transmissive display part 17 of the light guide 21 is substantially rectangular. The dimension of the long side of the transmissive section 16 is set to be equal to or greater than the width of the rotary reel 110 including the three reel bodies 111. The dimension of the short side of the transmissive section 16 is so set as to permit viewing of at least one picture on each reel body 111 of the rotary reel 110. Thereby, a predetermined number of pictures on the rotary reel 110, which is disposed on the back side of the backlight 15, is made visible through the transmissive section 16.

There has been a demand for reduction in thickness of the whole apparatus that includes the liquid crystal display device 1 with the above-described structure and the rotary reel 110. In a case where a light guide having a uniform thickness over its entire area is adopted, it becomes possible to reduce the thickness of the whole apparatus by decreasing the thickness of the light guide 21. In this case, however, the area of each side surface, i.e., light incidence surface, which is opposed to the associated cold-cathode fluorescent lamp 22, becomes smaller, leading to deterioration in efficiency of use of light.

As is shown in FIGS. 2 to 4, the thickness at edges 21E, which define the transmissive display part 17 (i.e. opening part 21A in the first embodiment) of the light guide 21, is set to be less than the thickness at the side surface (i.e. light incidence surface) of the light guide 21, which is opposed to the light source unit 20. Thereby, it becomes possible to secure the space for accommodating the rotary reel 110, which is disposed to face the transmissive display part 17, without reducing the area of the light incidence surface of the light guide 21. The "thickness", in this context, corresponds to a dimension in a normal direction N to the first major surface 21*b* of the light guide 21.

In the first embodiment, the transmissive display part 17, i.e. the opening part 21A, is substantially rectangular and is defined by four end faces along four edges 21E. The thickness at end faces 21EA and 21EC, which are parallel to the rotational axis O of the rotary reel 110, are less than the thickness at the first side surface 21*a* and second side surface 21*c*, which are opposed to the associated cold-cathode fluorescent lamps 22.

Specifically, as regards the light guide 21, the first side surface 21*a* is opposed to the end face 21EA, and the second side surface 21*c* is opposed to the end face 21EC. In this structure, the light guide 21 includes a wedge-shaped part that gradually decreases in thickness from the first side surface 21*a* toward the end face 21EA, and also a wedge-shaped part that gradually decreases in thickness from the second side surface 21*c* toward the end face 21EC. In other words, the light guide 21 includes inclined surfaces 21S on the second major surface (back surface) 21*d*, which are inclined outward from the transmissive display part 17. In the example shown in FIG. 3, the inclined surfaces 21S comprise a surface that spans between the first side surface 21*a* and end face 21EA, and a surface that spans between the second side surface 21*c* and end face 21EC. The angle of inclination of each inclined surface 21S is set in a range between 20° and 80°, preferably between 30° and 60°. The angle of inclination, in this context, corresponds to an angle that is formed between a plane, which is parallel to the first major surface 21*b*, and the inclined surface 21S. The wedge-shaped parts are coupled via thin parts having a thickness that is equal to the thickness at the end faces 21EA and 21EC.

By virtue of the above-described structure, the small-thickness part of the light guide 21 is provided with a space that can accommodate at least a part of the rotary reel 110. Thus, the rotary reel 110 can be disposed closer to the liquid crystal display panel 2 by a distance corresponding to the difference in thickness between the light incidence surface of the light guide 21 and the end face at which the thickness is small. Accordingly, the thickness of the whole apparatus including the liquid crystal display device 1 and rotary reel 110 can be reduced.

Besides, the areas of the first side surface 21a and second side surface 21c, which correspond to the light incidence surfaces, can be determined on the basis of the size and luminance of the cold-cathode fluorescent lamps 22, without restraints due to the demand for reduction in thickness. Thus, the efficiency in use of emission light from the cold-cathode fluorescent lamps 22 is not degraded, and the luminance of the backlight 15 that illuminates the liquid crystal display panel 2 can be enhanced. Hence, the number of optical sheets 24, which are interposed between the light guide 21 and liquid crystal display panel 2, can be reduced, and the thickness of the apparatus can be reduced by a degree corresponding to the thickness of the optical sheets 24 that are dispensed with. Moreover, since an expensive optical sheet, such as a light converging sheet, for improving the efficiency in light use can be dispensed with, the cost of the backlight 15 can be reduced.

The opening part 21A is formed as the transmissive display part 17 of the light guide 21. Thereby, the weight of the light guide 21 can be reduced, and accordingly the weight of the liquid crystal display device 1 can be reduced. In addition, since the rotary reel 110 is visible without intervention of the backlight 15, the visibility of the rotary reel 110 can be enhanced. Furthermore, the optical sheet 25 has an opening part 25A that is greater in size than the opening part 21A of the light guide 21, and part of the second major surface 21d of the light guide 21 is exposed. As a result, part of the light, which propagates through the inside of the light guide 21, leaks from the second major surface 21d, and the leaking light illuminates the rotary reel 110. Thereby, the visibility of the rotary reel 110 can further be improved.

Figure 5:
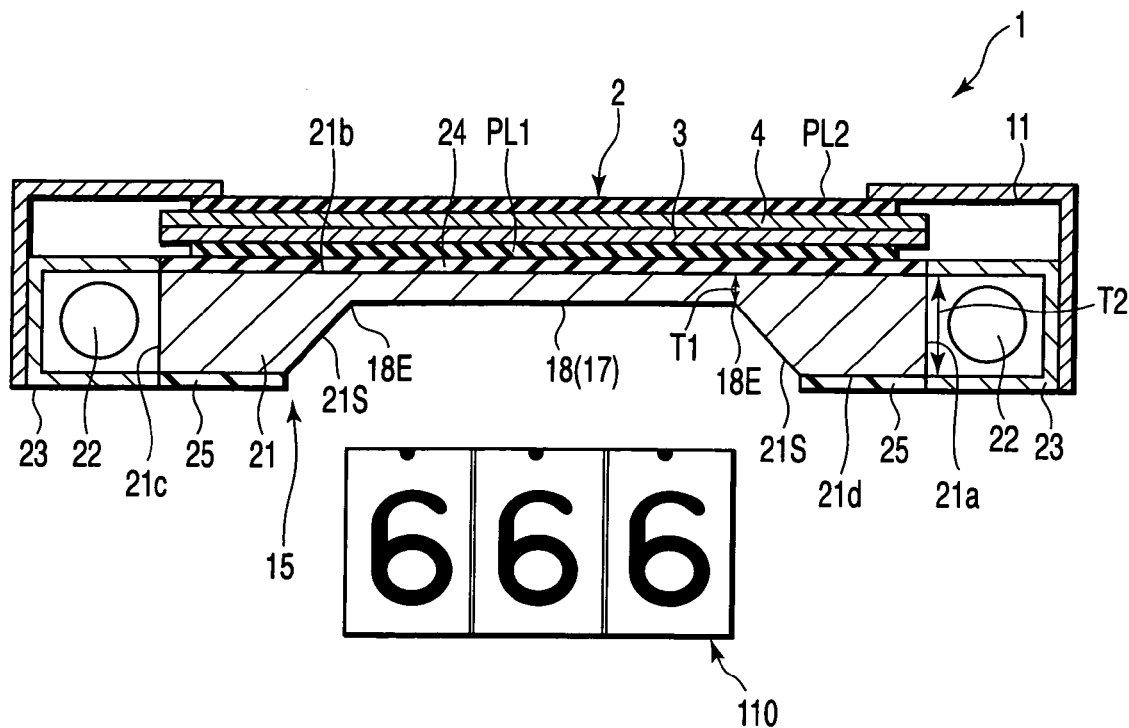
FIG. 5 is a cross-sectional view that schematically shows the structure of a liquid crystal display device according to a second embodiment, which is applied to a game machine.
Figure 6:
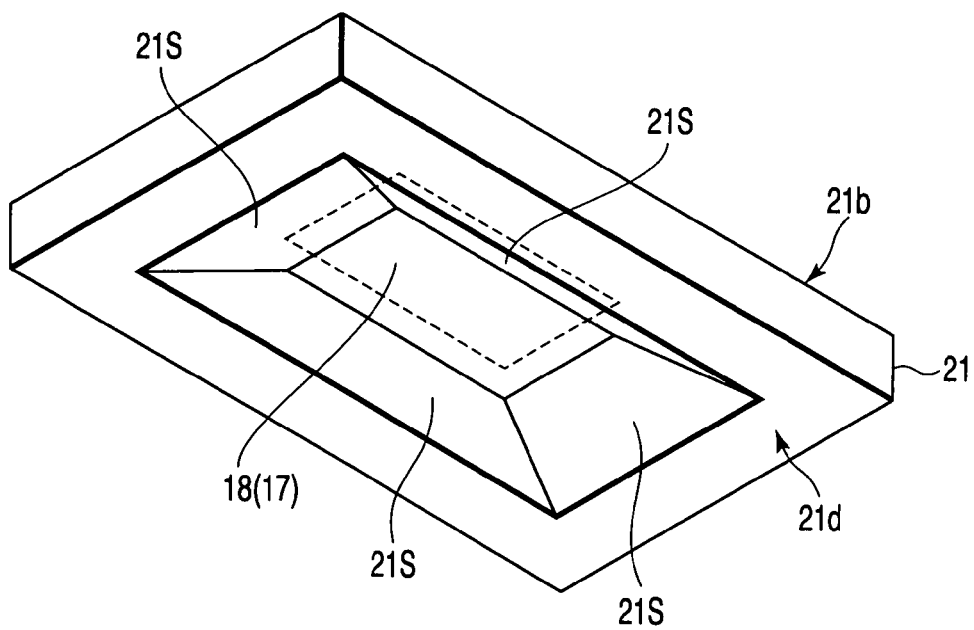
FIG. 6 is a perspective view that schematically shows the structure of a light guide that is applicable to the liquid crystal display device shown in FIG. 5.

Next, a liquid crystal display device 1 according to a second embodiment is described referring to FIG. 5 and FIG. 6. FIG. 5 shows only main parts, and the parts common to those in the first embodiment are denoted by like reference numerals and a description thereof is omitted.

The light guide 21 has a substantially rectangular plan-view shape, and a substantially central part of the back surface 21d has a recess portion 18 with a substantially rectangular plan-view shape as the transmissive display part 17. The position of the recess portion 18 corresponds to the position of the rotary reel 110, and the recess portion 18 has a slightly greater size than the rotary reel 110. The depth of the recess portion 18 is in a range between 50% and 90%, preferably between 60% and 80%, of the thickness of the light guide 21. The light guide 21 has inclined surfaces 21S on its back surface 21d, which are inclined outward from the recess portion 18. In the example shown in FIG. 5 and FIG. 6, the inclined surfaces 21S correspond to four peripheral walls surrounding the recess portion 18. The angle of inclination of each inclined surface 21S is in a range between 20° and 80°, preferably between 30° and 60°.

The light guide 21 is formed such that a thickness T1 at each edge 18E that defines the recess portion 18 is less than a thickness T2 at the side surface (light incidence surface) that is opposed to the light source unit 20. The thickness of the recess portion 18 is substantially equal to the thickness T1 at the edge 18, and the thickness of the light guide 21 gradually increases from the recess portion 18 toward the outside, that is, toward the light incidence surface.

The rotary reel 110 is disposed on the back side of the backlight 15 so as to face the recess portion 18, with a slight gap being provided from the backlight 15.

When an image is to be displayed on the liquid crystal display device 1 with the above-described structure, a video signal is supplied to the liquid crystal display panel 2, and the cold-cathode fluorescent lamps 22 are turned on to illuminate the liquid crystal display panel 2 through the light guide 21. Thus, an image is displayed.

While light from the cold-cathode fluorescent lamps 22 passes through the light guide 21, the light is reflected by the optical sheet 25 toward the upper surface 21b of the light guide 21 and uniformly emitted from the array substrate 3 of the liquid crystal display panel 2 via the optical sheet 24. In addition, a part of the light guide 21, which is thinner than the other part of the light guide 21, is present at the position of the recess portion 18. Thus, the light from the cold-cathode fluorescent lamps 22 enters this part of the light guide 21, and the liquid crystal display panel 2 is also illuminated at the position of the recess portion 18.

In the second embodiment, the width of the rotary reel 110 is made to be substantially equal to the width of the surface (first major surface 21b) of the transmissive display part 17, which is opposed to the liquid crystal display panel 2. In addition, the inclined surfaces 21S are provided at four sides that surround the transmissive display part 17. Thereby, the visibility of the inclined surfaces 21S from the viewer's side is lowered, and the appearance of the transmissive display part 17 can be improved.

Since the light guide 21 is provided with the inclined surfaces 21S, the leak of light to the back surface side of the light guide 21 can be suppressed and the light can positively be emitted to the upper surface side. Thus, non-uniformity in display can be reduced.

Furthermore, the light guide 21 is not provided with a through-hole (opening part) at a position corresponding to the transmissive display part 17. Thus, the strength of the light guide 21 can be improved.

Figure 7:
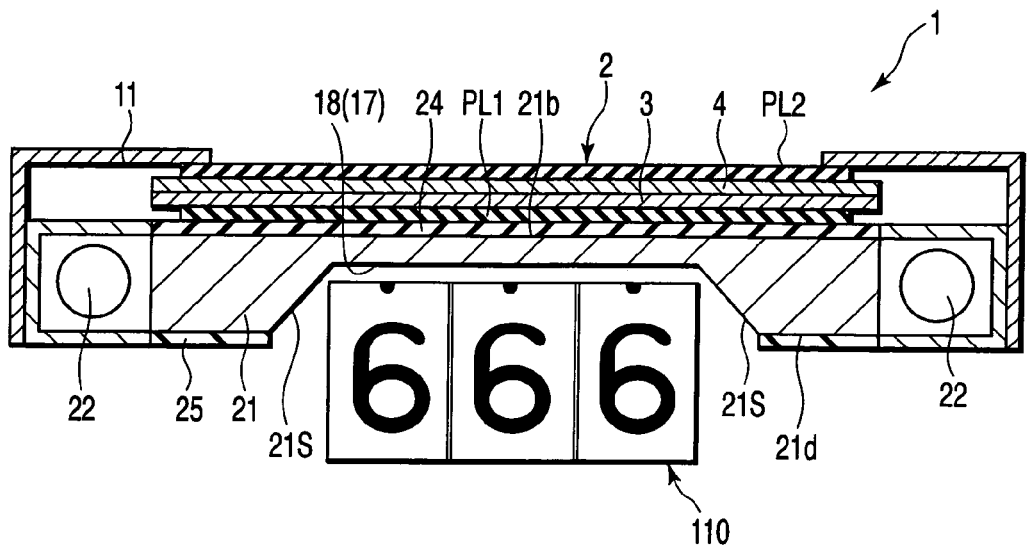
FIG. 7 is a cross-sectional view that schematically shows the structure of a liquid crystal display device according to a third embodiment, which is applied to a game machine.

Next, a liquid crystal display 1 according to a third embodiment is described referring to FIG. 7.

The third embodiment differs from the second embodiment with respect to the position where the rotary reel 110 is disposed. In the second embodiment, the rotary reel 110 is disposed with a slight distance from the back surface of the backlight 15. In the third embodiment, as shown in FIG. 7, at least a part of the rotary reel 110 is accommodated within the transmissive display part 17. Specifically, the transmissive display part 17 corresponds to the recess portion 18 that is opposed to the rotary reel 110, and the transmissive display part 17 has a size equal to or greater than the size of the rotary reel 110. Thus, the rotary reel 110 can be accommodated within the space surrounded by the inclined surfaces 21S, that is, within the recess portion 18.

By accommodating at least a part of the rotary reel 110 within the recess portion 18, the distance between the liquid crystal display panel 2 and rotary reel 110 is reduced, and the thickness of the whole apparatus can be reduced. Moreover, the display content on the rotary reel 110 can be displayed more clearly, and the light leaking from the light guide 21 to the back surface 21d side can illuminate the rotary reel 110 more easily. Therefore, the visibility of the rotary reel 110 is further improved.

Figure 8:
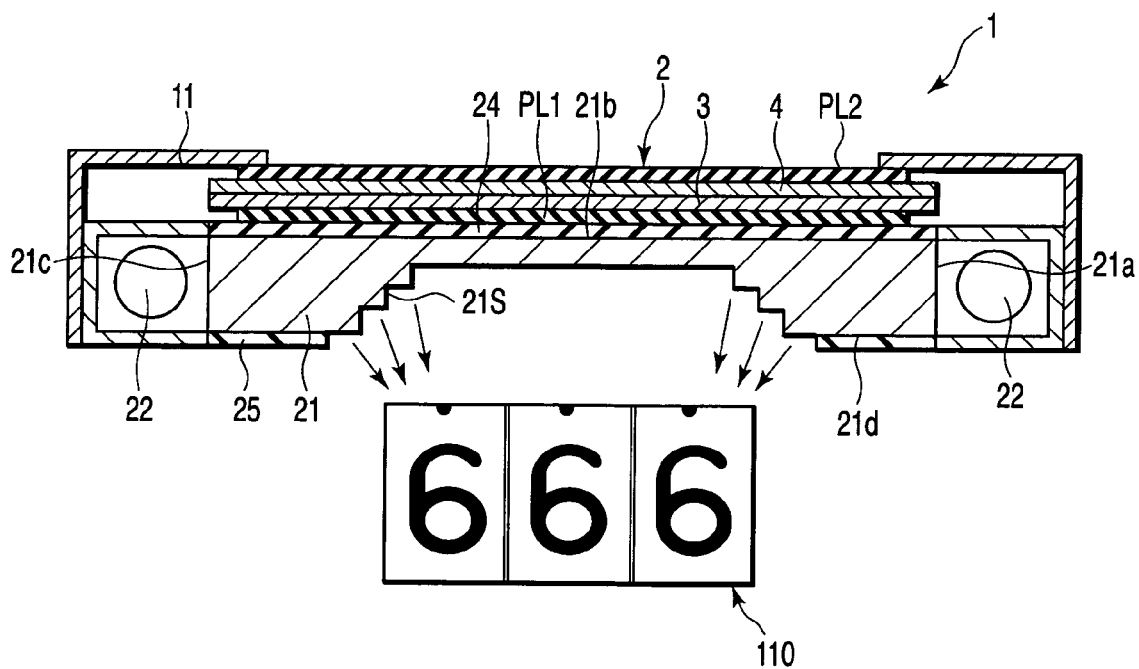
FIG. 8 is a cross-sectional view that schematically shows the structure of a liquid crystal display device according to a fourth embodiment, which is applied to a game machine.

Next, a liquid crystal display device 1 according to a fourth embodiment is described referring to FIG. 8.

The fourth embodiment differs from the second embodiment with respect to the structure of each inclined surface 21S. In the fourth embodiment, as shown in FIG. 8, the inclined surface 21S is not planar, but has a prism shape with irregularities. By forming the inclined surface 21S in the prism shape, the direction of light that leaks from the light guide 21 to the back surface 21d side can be controlled, and the light from the cold-cathode fluorescent lamp 22 can efficiently be guided to the rotary reel 110. Thereby, the visibility of the rotary reel 110 can further be improved.

In the fourth embodiment, like the third embodiment, at least a part of the rotary reel 100 may be accommodated within the recess portion 18. Thereby, the thickness of the whole apparatus can be reduced, and the visibility of the rotary reel 110 can further be enhanced.

Figure 9:
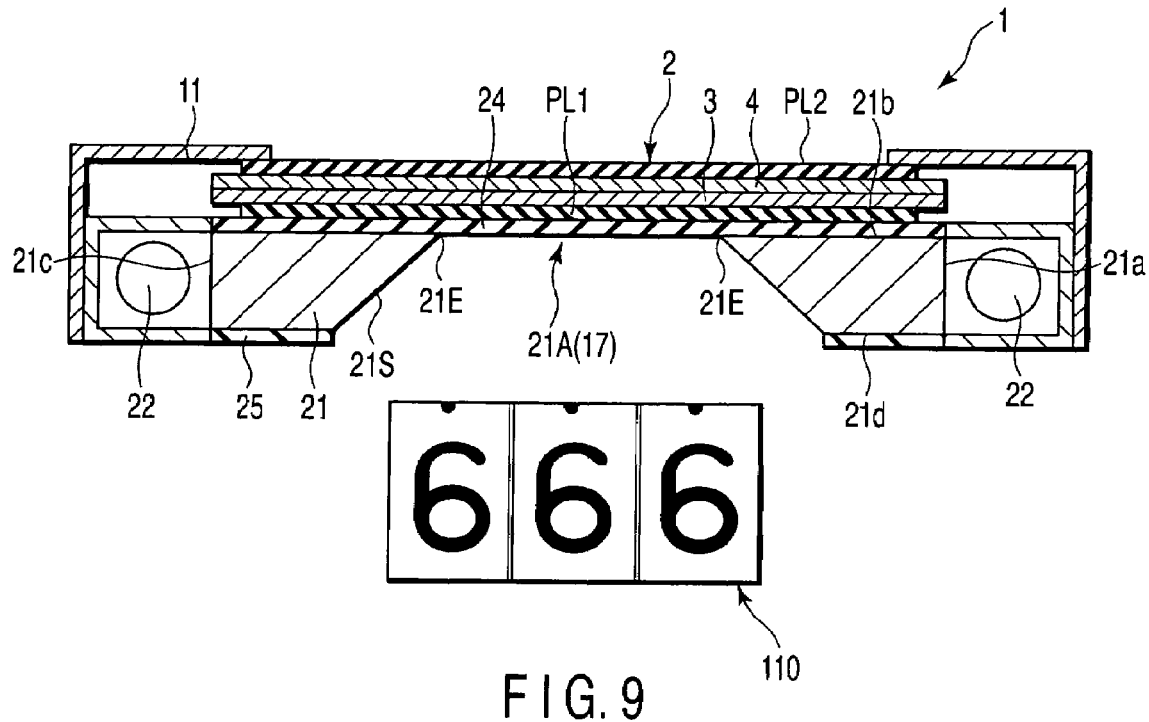
FIG. 9 is a cross-sectional view that schematically shows the structure of a liquid crystal display device according to a fifth embodiment, which is applied to a game machine.

Next, a liquid crystal display device 1 according to a fifth embodiment is described with reference to FIG. 9.

The fifth embodiment differs from the second embodiment with respect to the following point. In the second embodiment, the recess portion 18 is provided as the transmissive display part 17 of the light guide 21. In the fifth embodiment, as shown in FIG. 9, the light guide 21 has a through-hole opening part 21A at its substantially central region. The opening part 21A is substantially the same as that in the first embodiment, but the four sides of the opening part 21A in the fifth embodiment are surrounded by inclined surfaces 21S.

In the fifth embodiment, too, the light guide 21 is formed such that the thickness at the edge 21E that defines the opening part 21A is less than the thickness at the side surface (light incidence surface) 21a, 21c that is opposed to the light source unit 20. In this example, the edge 21E corresponds to a corner portion located at a wedge-shaped distal end portion, and the thickness at the edge 21E is infinitely close to zero.

With this structure, too, the rotary reel 110 can be illuminated by the light leaking from the inclined surfaces 21S, and the visibility of the rotary reel 110 can be improved.

In addition, since the four sides of the opening part 21A are surrounded by the inclined surfaces 21S, a sufficient strength can be secured.

In the fifth embodiment, like the third embodiment, at least a part of the rotary reel 100 may be accommodated within the opening part 21A. Thereby, the thickness of the whole apparatus can be reduced, and the visibility of the rotary reel 110 can further be enhanced.

Figure 10:
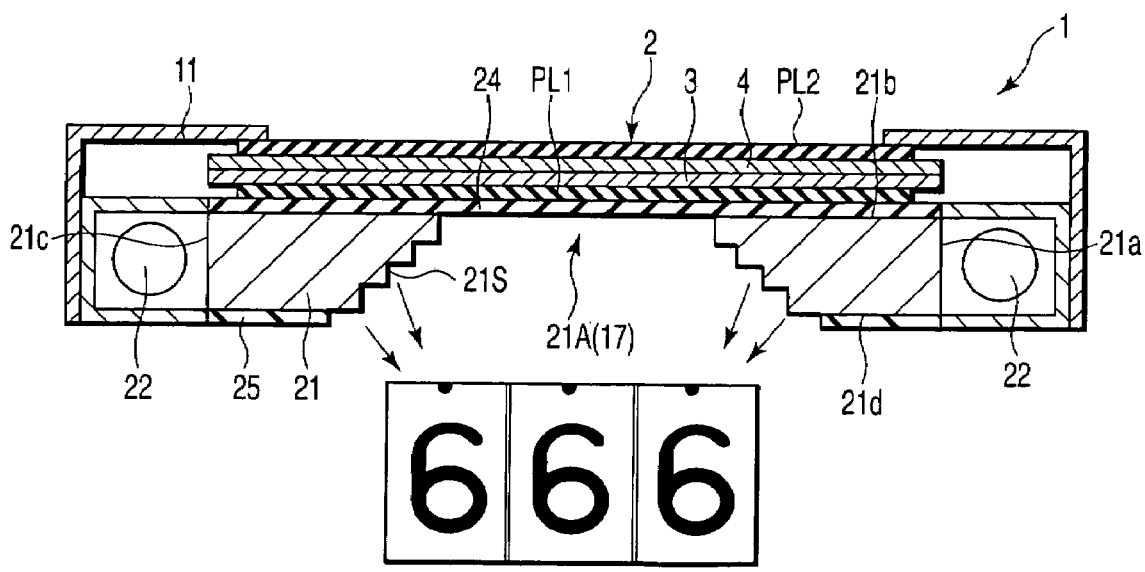
FIG. 10 is a cross-sectional view that schematically shows the structure of a liquid crystal display device according to a sixth embodiment, which is applied to a game machine.

Next, a liquid crystal display device 1 according to a sixth embodiment is described with reference to FIG. 10.

The sixth embodiment differs from the fifth embodiment with respect to the structure of each inclined surface 21S. In the sixth embodiment, as shown in FIG. 10, the inclined surface 21S is not planar, but has a prism shape with irregularities. By forming the inclined surface 21S in the prism shape, the direction of light that leaks from the back surface 21d of the light guide 21 can be controlled, and the light from the cold-cathode fluorescent lamp 22 can efficiently be guided to the rotary reel 110. Thereby, the visibility of the rotary reel 110 can further be improved.

In the sixth embodiment, like the third embodiment, at least a part of the rotary reel 100 may be accommodated within the opening part 21A. Thereby, the thickness of the entire apparatus can be reduced, and the visibility of the rotary reel 110 can further be enhanced.

As has been described above, according to the liquid crystal display devices according to the embodiments of the invention, which are applicable to game machines, the light guide of the backlight includes the transmissive display part, which is formed of an opening part or a recess portion, at a position corresponding to the position of the display medium (rotary reel). Thereby, the weight of the light guide is reduced, and the weight of the liquid crystal display device is reduced. The display medium is made visible, without intervention of the backlight, or through the thin recess portion. Thus, the visibility of the display medium can be improved.

In the light guide, the thickness at the end face along the edge, which defines the transmissive display part, is less than the thickness at the light incidence surface that is opposed to the light source. Thus, the space for accommodating the display medium, which is opposed to the transmissive display part, can be provided while the area of the light incidence surface of the light guide is secured so as to obtain a sufficient luminance of backlight. Thereby, the thickness of the whole apparatus including the display medium can be reduced. Moreover, the cost of the backlight can be reduced.

The present invention is not limited to the above-described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

In each of the above-described embodiment, the mechanical rotary reel 110 is used as the display medium. Alternatively, other display elements may be applied as the display medium.

Besides, an illuminating device for illuminating the display medium may separately be provided.

What is claimed is:

1. A display device comprising:
   a transmissive liquid crystal display panel that is disposed on a front side of a display medium that effects variable display; and
   an area light source device that is disposed between the liquid crystal display panel and the display medium and illuminates a back surface of the liquid crystal display panel,
   wherein the area light source device includes:
   a light source; and
   a light guide that includes a transmissive display part, which is opposed to the display medium, and emits light, which is radiated from the light source, toward the liquid crystal display panel, and
   the light guide is configured such that a thickness at an end face along an edge that defines the transmissive display part is less than a thickness at a surface of the light guide, which is opposed to the light source.

2. The display device according to claim 1, wherein the transmissive display part is substantially rectangular.

3. The display device according to claim 2, wherein as regards the end faces along four edges, a thickness at end faces that are parallel to a longitudinal direction of the display medium is less than the thickness at the surface of the light guide, which is opposed to the light source.

4. The display device according to claim 1, wherein the light guide is substantially rectangular, and said light sources are disposed to face two side surfaces along long sides of the light guide.

5. The display device according to claim 1, wherein the area light source device includes an optical sheet that is disposed between the light guide and the liquid crystal display panel and imparts predetermined optical characteristics to emission light from the light guide.

6. The display device according to claim 1, wherein the light guide includes a recess portion, which corresponds to the transmissive display part, on a back surface of the light guide, which is opposed to the display medium.

7. The display device according to claim 1, wherein the light guide includes an opening part that corresponds to the transmissive display part.

8. The display device according to claim 1, wherein the light guide includes an inclined surface, which is inclined outward from the transmissive display part, on a back surface of the light guide, which is opposed to the display medium.

9. The display device according to claim 8, wherein the angle of inclination of the inclined surface is in a range between 20° and 80°.

10. The display device according to claim 8, wherein the inclined surface has a prism shape.

11. The display device according to claim 6, wherein the transmissive display part has a depth in a range between 50% and 90% of the thickness of the light guide.

12. The display device according to claim 1, wherein at least a part of the display medium is accommodated in the transmissive display part.

13. The display device according to claim 1, wherein the area light source device includes a reflection plate that is disposed on a back surface of the light guide at an area other than the transmissive display part.

14. The display device according to claim 1, wherein the display medium is disposed at a substantially central part of the liquid crystal display panel.

15. The display device according to claim 1, further comprising a mechanical rotary reel, which is rotatably disposed, as the display medium.

\* \* \* \* \*

UNITED STATES PATENT AND TRADEMARK OFFICE
CERTIFICATE OF CORRECTION

PATENT NO. : 7,327,417 B2 Page 1 of 1
APPLICATION NO. : 11/197398
DATED : February 5, 2008
INVENTOR(S) : Masakazu Kitagawa et al.

It is certified that error appears in the above-identified patent and that said Letters Patent is hereby corrected as shown below:

On the title page, Item (73), the Assignee information is incorrect. Item (73) should read as follows:

-- (73) Assignee: Toshiba Matsushita Display Technology Co., Ltd., Tokyo (JP) --

Signed and Sealed this

Twentieth Day of May, 2008

JON W. DUDAS
*Director of the United States Patent and Trademark Office*